Oct. 10, 1950          T. O. STRAUSS          2,524,852

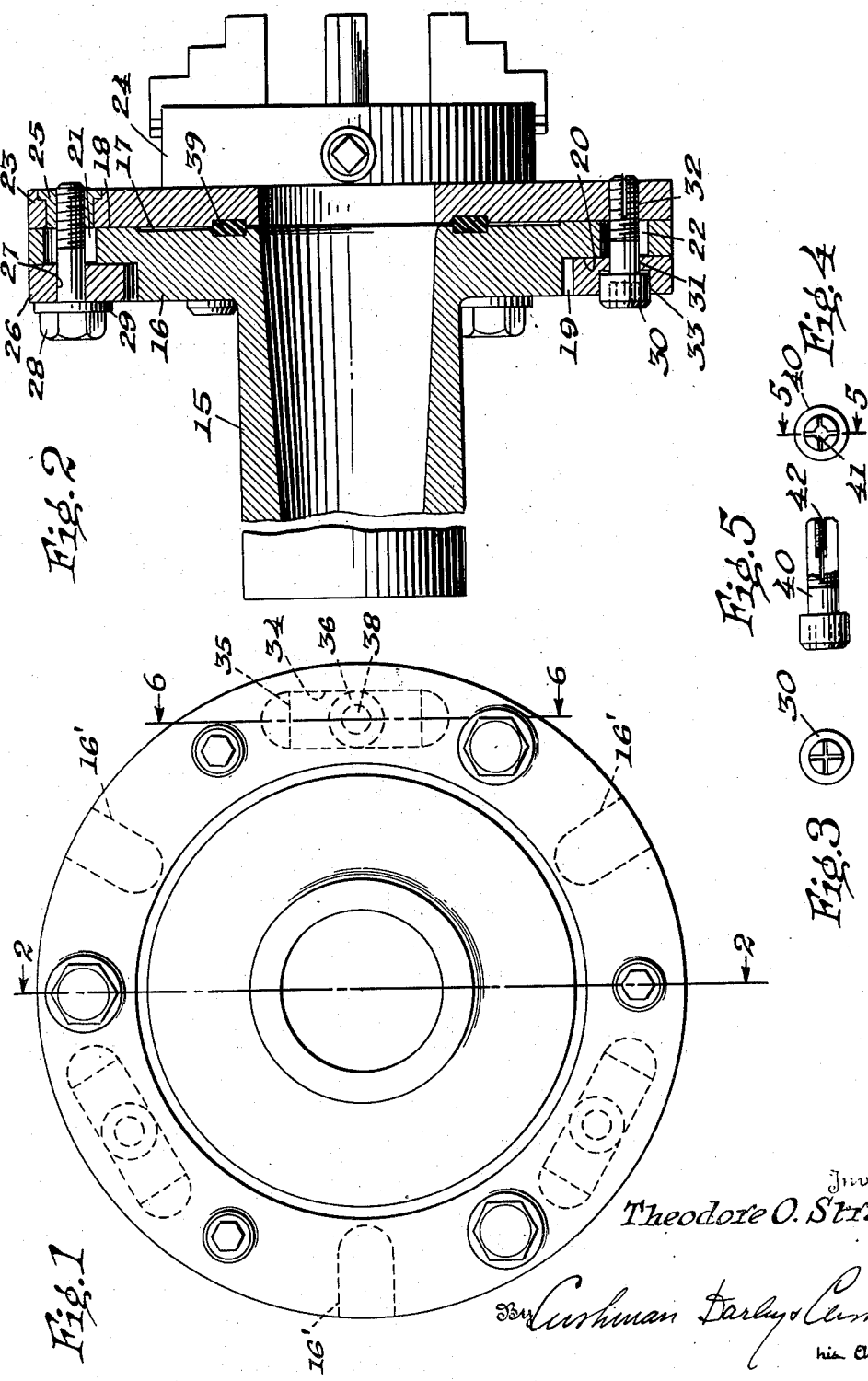

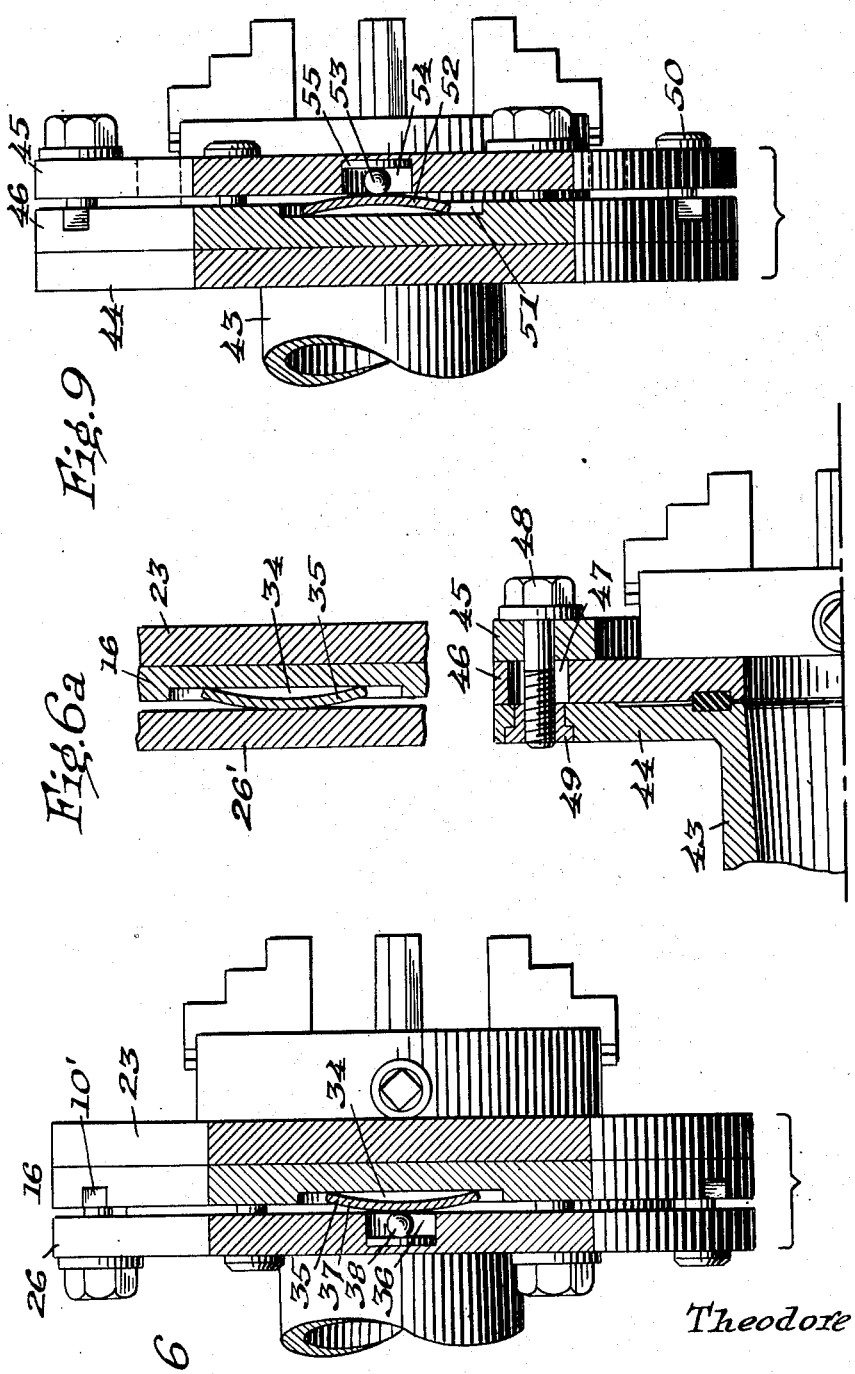

CHUCK MOUNTING MEANS

Filed Feb. 5, 1946          4 Sheets-Sheet 3

Inventor
Theodore O. Strauss,

By Cushman Darby & Cushman
his Attorneys

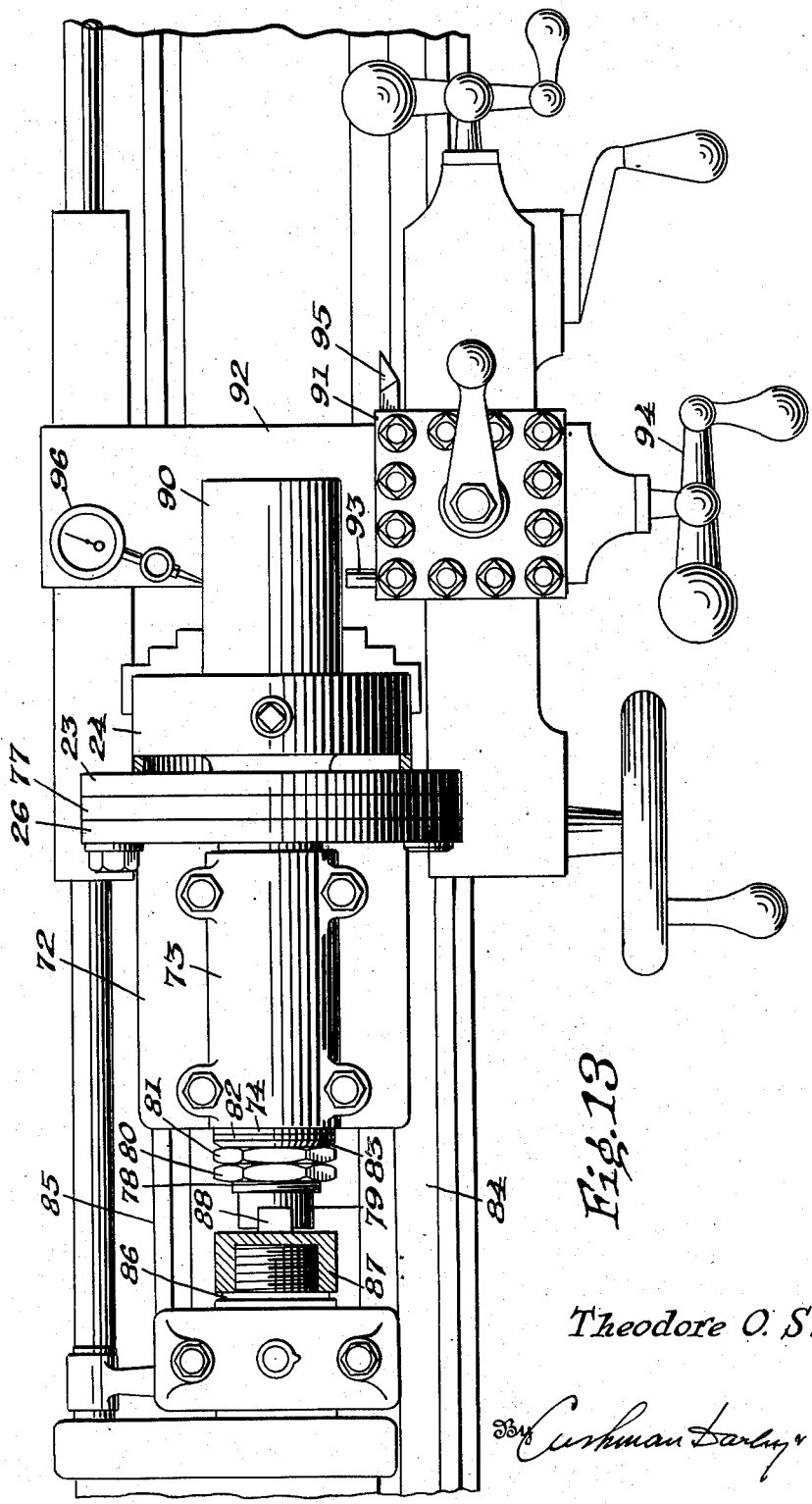

Patented Oct. 10, 1950

2,524,852

UNITED STATES PATENT OFFICE 2,524,852

CHUCK MOUNTING MEANS

Theodore O. Strauss, New York, N. Y.

Application February 5, 1946, Serial No. 645,559

9 Claims. (Cl. 279—6)

In the co-pending application of William M. Mackay and myself, Serial No. 625,208, filed October 29, 1945, there is disclosed a chuck holder comprising a back plate for mounting on a lathe spindle or the like, a chuck mounting plate in face to face relation with the front of the back plate, a ring at the rear of the back plate, clamping means connecting the ring and mounting plate, and spring means whereby when the clamping bolts are loosened, the back plate is yieldingly clamped between the ring and mounting plate so that the mounting plate can be universally radially displaced relative to the back plate for the accurate centering of a work piece in the chuck. After the centering operation, the clamping means is tightened to rigidly clamp the mounting plate and maintain the chuck in centered relation.

When the clamping means is loosened during the centering operation, the back plate has frictional contact with both the mounting plate and the ring and, in some cases, the frictional resistance thus offered to the displacement of the mounting plate is unnecessarily high. It is an object of the present invention to reduce the frictionally contacting areas by so disposing the spring means as to move the ring out of contact with the intermediate plate, anti-friction thrust transmitting means being preferably provided in association with the spring means. Another object of the invention is to provide a rigid back plate mounting so that chattering, even under the deepest cuts, is avoided.

Figure 11:
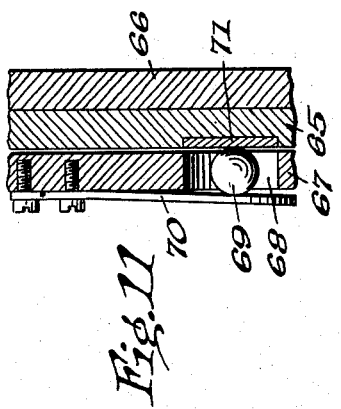
Figure 10:
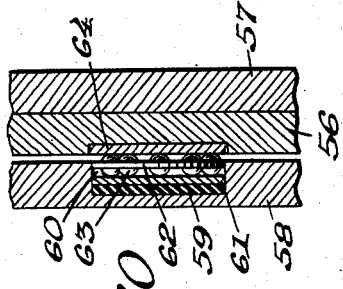
Figure 7:
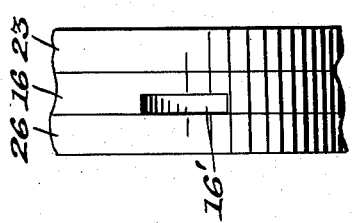
Figure 12:
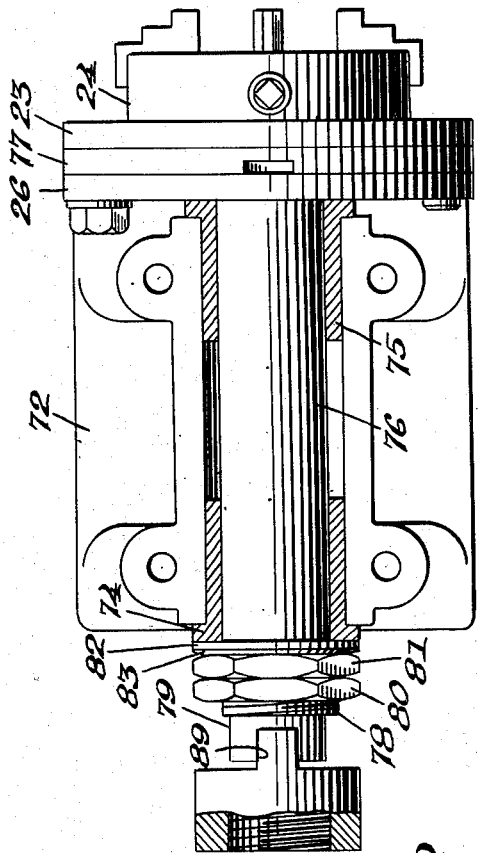

Illustrative embodiments of the invention are shown in the accompanying drawings in which Figure 1 is a rear elevation of chuck mounting means in accordance with the invention, Figure 2 is a section on line 2—2 of Figure 1, Figure 3 is an end view of a connecting bolt appearing in Figures 1 and 2, Figure 4 is an end view of a modified form of bolt, Figure 5 shows the bolt of Figure 4 partially in section on line 5—5 of Figure 4, Figure 6 is a section on line 6—6 of Figure 1, Figure 6a is a partial view similar to that of Figure 6 showing a modification, Figure 7 is a partial elevation of the holder of the preceding figures, Figure 8 is a partial axial section of a modified form of holder, Figure 9 is a view taken like that of Figure 6 of the holder of Figure 8, Figures 10 and 11 are partial views taken like that of Figure 6 showing further modifications, Figure 12 is a plan view partly in horizontal section of a chuck mounting unit including independent bearing means for the chuck holder, and Figure 13 is a partial plan view of a lathe showing the unit of Figure 12 mounted for use.

Referring to Figures 1 to 6, reference numeral 15 designates a hollow lathe spindle having at its outer end an integral concentric circular plate 16 which is slightly relieved at 17 to provide a flat annular face 18 normal to the spindle axis. The rear face of plate 16 is provided with an annular rabbet 19 providing a flat annular face 20 normal to the spindle axis. Near its periphery plate 16 is provided, as here shown, with three openings as at 21, Figure 2, which are equi-distantly spaced apart on equal radii, and midway between the openings 21 the plate is provided with openings 22.

Reference numeral 23 designates a chuck mounting plate carrying a chuck 24. Plate 23 may be formed as a flange integral with the chuck body or may be coupled with the latter in any suitable manner. The chuck is preferably of the self-centering type but any other suitable type may be used. Set in plate 23 are three bushing nuts 25 of hardened material, these being disposed so as to be registrable with the openings 21. Disposed in the rabbet 19 is a ring 26 provided with bores as at 27 registrable with the openings 21. Reference numeral 28 designates hex-headed bolts passed through washers 29, bores 27, openings 21, and threaded into the nuts as at 25. With the bolts tightened, mounting plate 23 and ring 26 are rigidly clamped against plate 16 so that a rigid unit is provided.

Reference numeral 30 designates socket-headed bolts passed through bores as at 31 in ring 26, openings 22, and engaged in threaded bores 32 in plate 23. The threaded end of each bolt 31 is split in rectangularly relates planes which intersect the bolt axis and the split end is somewhat spread so that when the bolts are threaded in bores 32, their adjusted position will be frictionally maintained. The bolt heads are received in sockets as at 33 and in the adjusted position of the bolts, the underside of their heads is slightly spaced from the bottom walls of the sockets.

The back plate 16 is provided on its rear face with three elongated milled recesses 34 having parallel side walls, the recesses being equi-distantly spaced apart on equal radii with their longitudinal axes coincident with the sides of an equi-lateral triangle. The illustrated semi-circular ends of the recesses are incidental to the milling operation. Disposed in each recess is an outwardly bowed leaf spring 35 of such length that it can substantially flatten in the recess without interference with the ends thereof, the spring having slight lateral clearance in the recess so as to be free flexing. Opposite the central portions of recesses 34, ring 26 is provided with circular recesses 36 against the bottom walls of which are set wear discs as at 37, Figure 6 of hard metal, and bearing against the discs are rolling members here shown as balls 38 which project slightly from the recesses and engage the central portions of the leaf springs. The balls are large enough so that no matter what their location in the recesses, here shown as having a considerably larger diameter than that of the balls, the balls will always engage the springs. When bolts 28 are tightened so that the back plate and mounting plate are clamped together, the depth of recesses 34 permits the disappearance therein of the springs without completely flattening them. When bolts 28 are loosened, the springs act through the balls to force ring 26 away from plate 16 a distance determined by the stop bolts 30. In the ensuing centering operation, fully described in the application above mentioned, the chuck mounting plate is displaceable against only the frictional engagement between the mounting plate and the back plate, ring 26 moving substantially frictionlessly with the mounting plate due to the provision of the anti-friction means. When centering has been obtained, bolts 28 are again tightened.

As here shown, greater clearance is provided by openings 21 than by openings 22. Thus, the walls of openings 21 can never come in contact with the shanks of bolts 28. If such contact were permitted and the shanks were at all out of round, the centered adjustment could be upset when the bolts were turned in the tightening operation. In order to prevent cuttings and the like from getting between the opposed friction faces of the two plates, the latter are provided with opposed annular grooves receiving an annular sealing member or gasket 39 of sponge "Neoprene" or the like, the gasket being readily distortable so as not to interfere with the displacement of the mounting plate relative to the back plate. Plate 16 is provided with radial slots 16' into which a bar can be inserted for holding or turning.

Reference numeral 40, Figures 4 and 5, designates a stop bolt usable instead of the bolt 30. The threaded end of bolt 40 is split in the same manner as that of bolt 30, but, additionally, is provided with a threaded axial bore 41 engageable by an expanding screw 42.

The device of Figure 6a is like that of Figure 6 except that in the ring 26', the recess 36, disc 37 and ball 38 are omitted, the spring 35 bearing at its central portion against the flat adjacent face of the ring.

In order to produce a more compact device, the arrangement shown in Figures 8 and 9 may be adopted. In these figures reference numeral 43 represents a lathe spindle or the like provided with an integral back plate 44. In this case the ring 45 is disposed against the front face of the mounting plate 46 and the latter is provided with enlarged openings as at 47, bolts as at 48 being passed through bores in ring 45 and through the openings 47 and threaded into hardened bushing nuts 49 set in plate 44. Reference numeral 50 designates stop bolts like those of Figure 2 but passed through the ring and openings in the mounting plate and threaded into openings in the back plate. The mounting plate is provided on its front face with elongated recesses 51 receiving bowed leaf springs 52, the same as springs 35 of Figure 6, the springs engaging balls as at 53 in recesses as at 54 and bearing against wear discs 55. The device is, of course, used in the same manner as the first embodiment. Greater clearance is provided at the rear of the back plate, the ring 45 surrounding the chuck and thus occupying no extra space axially of the device.

In Figure 10, reference numeral 56 designates the back plate, 57 the chuck mounting plate and 58 the ring, all associated in the manner shown in Figures 1, 2 and 6. In this case, the spring means is constituted by a circular pad or block 59 of elastic material, such as synthetic rubber, set in the bottom of a circular recess 60 formed in the front face of ring 58. A plate 61 of hard metal is disposed against the pad 59 and is slidable in the recess. Reference numeral 62 designates a carrier ring for a circular series of balls 63 which bear at one side against disc 61 and at the other side against a hardened insert disc 64 set flushly in the rear face of the back ring 56. In Figure 10 the clamping bolts are assumed to be loosened and pad 59 has expanded to separate ring 58 slightly from back plate 56, the amount of separation being shown somewhat exaggerated. When the clamping bolts are tightened the elastic pad is compressed, permitting the balls to disappear in recess 60 as the opposed faces of members 56 and 58 come into locking contact.

In Figure 11 reference numeral 65 designates the back plate, 66 the chuck mounting plate, and 67 the ring. The latter is provided with three symmetrically disposed through-openings as at 68 which receive balls as at 69 of somewhat greater diameter than the thickness of the ring. Leaf springs as at 70 secured to the back of the ring press the balls as at 69 against hard metal inserts as at 71 set in the rear face of the back plate. The plates and ring are associated through clamping and stop bolts as described in connection with the first embodiment and the mode of use is the same.

I prefer to use an integral spindle and back plate since this affords the most rigid support for the chuck, eliminating chattering. The advantages of this construction can be obtained, without disturbing the usual lathe spindle, by providing a unit such as is shown in Figures 12 and 13. In these figures, reference numeral 72 designates the lower half of a horizontally split bearing block whose cap portion is indicated at 73 in Figure 13. Through bushings 74 and 75 the block supports a horizontal shaft 76 having formed integrally therewith a back plate 77, here shown as clamped between the mounting plate 23 and ring 26 of the first embodiment. The opposite end of the shaft has a threaded portion 78 adjacent a reduced extremity 79, the threaded portion being engaged by nuts 80 and 81 between the latter of which and a washer 82 is an annular dished spring 83 whereby the back plate 77 is held against the front face of bushing 75. The block 72 is adapted to be mounted on and secured to the rails 84 and 85 of the lathe, as shown in Figure 13, the height of the block being such that shaft 76 is substantially alignable with the spindle 86 of the lathe. Threaded on the spindle nose is a cap 87 having on its front face a diametrically disposed rib 88 engaged in a diametrical groove 89 in the reduced end 79 of shaft 76, the spindle and shaft being thus operatively coupled.

In Figure 13 the chuck 23 is shown as engaging a work piece 90 having a cylindrical external surface. Reference numeral 91 designates a turret on the cross slide 92, the turret mounting a follower member 93 of soft metal. With the clamping screws of the mounting device loosened, the cross slide screw is turned through its handle 94 to bring the follower against the surface of the work piece and when contact between the two becomes constant, centering has been accomplished, the follower is withdrawn, and the clamping bolts are tightened. Accurate centering is thus secured in a matter of seconds. The turret can be then manipulated to bring a tool 95 against the work. It will be understood that if the latter has a cylindrical inner surface, a suitable follower for cooperation therewith can be provided. Reference numeral 96 designates a test indicator on the cross slide usable in well known manner to test the centering of the work piece.

It will thus be evident that the invention is susceptible of varied embodiment. While I have emphasized the use of an integral spindle and back plate for best results, it will be evident that the back plate may be threaded on or otherwise associated with the usual spindle in the manner disclosed in the application above mentioned. The clamping means may take other forms and while I prefer the disclosed clamping and stop bolts, it will be understood that the stop bolts may be omitted except that in such case care must be exercised to see that the clamping bolts are not sufficiently loosened so as to lose proper frictional engagement between the back and mounting plates. The great advantage of the stop bolts is that they can be set to permit the desired range of action of the spring means and, consequently, any unscrewing of the clamp bolts beyond this limit is without effect.

I claim:

1. A chuck holder comprising a back plate adapted for rotation by a supporting shaft, a chuck mounting plate in face to face relation with said back plate, the opposed faces of said plates being flat, a ring at the side of one of said plates opposite from the other of said plates, a plurality of bolts extending through enlarged openings in said one of said plates connecting said ring and said other plate, said bolts being tightenable to urge the two as clamping members against the intermediate plate or loosenable to permit displacement of said mounting plate relative to said back plate on any radius, compression spring means between said ring and the adjacent plate acting to hold the opposed faces of said plates in frictional contact with each other when said bolts are loosened so that said mounting plate can be forced radially relative to said back plate to center a chuck carried by said mounting plate, and anti-friction means in engagement with the spring means for transmitting the thrust of said spring means in a direction to clamp the chuck mounting plate against the backing plate when the threaded means is loosened.

2. Structure according to claim 1 wherein a plurality of sets of spring means and associated anti-friction means are provided, and wherein of the members constituted by said ring and adjacent plate, one has recesses receiving the spring means and the other has recesses opposed to the first recesses receiving the anti-friction means.

3. Structure according to claim 1 wherein a plurality of sets of spring means and associated anti-friction means are provided, wherein the spring means are bowed leaf springs and the anti-friction means are balls, and wherein of the members constituted by said ring and adjacent plate, one has recesses receiving the springs and the other has recesses opposed to the first recesses receiving the balls with slight outward projection.

4. Structure according to claim 1 wherein a plurality of sets of spring means and associated anti-friction means are provided, wherein the ring has opening therein opposed to said adjacent plate and containing balls which constitute the anti-friction means, and wherein the spring means are carried by said ring.

5. Structure according to claim 1 wherein a plurality of sets of spring means and associated anti-friction means are provided, wherein of the members constituted by said ring and adjacent plate, one has a plurality of pockets opposed to the other, wherein the spring means are elastic pads in said pockets, wherein wear discs are disposed against the outer faces of said pads, and wherein the anti-friction means includes balls which bear against said discs.

6. A chuck holder comprising a back plate adapted for rotation by a supporting shaft, a chuck mounting plate in face to face relation with said back plate, the opposed faces of said plates being flat, a ring at the opposite side of the back plate from the mounting plate, bolts connecting said ring and mounting plate through enlarged openings in said back plate for clamping said plates together, compression spring means between said ring and back plate acting to hold said plates in frictional engagement when said bolts are loosened, and anti-friction means for transmitting the thrust of said spring means in a direction to clamp the chuck mounting plate against the backing plate.

7. A chuck holder comprising a back plate adapted for rotation by a supporting shaft, a chuck mounting plate in face to face relation with said back plate, the opposed faces of said plates being flat, a ring at the opposite side of the mounting plate from said back plate, bolts connecting said rings and back plate through enlarged openings in said mounting plate for clamping said plates together, compression spring means between said ring and mounting plate acting to hold said plates in frictional engagement when said bolts are loosened, and anti-friction means for transmitting the thrust of the spring means in a direction to clamp the chuck mounting plate against the backing plate.

8. A chuck holder comprising a back plate adapted for rotation by a supporting shaft, a chuck mounting plate in face to face relation with said back plate, the opposed faces of said plates being flat, a ring at the opposite side of the back plate from the mounting plate, bolts connecting said ring and mounting plate through enlarged openings in said plate for clamping said plates together, and compression spring means between said ring and back plate acting when said bolts are loosened to separate said ring and back plate and to hold said plates in frictional engagement.

9. A chuck holder comprising a back plate adapted for rotation by a supporting shaft, a chuck mounting plate in face to face relation with said back plate, the opposed faces of said plates being flat, a ring at the opposite side of the mounting plate from said back plate, bolts connecting said ring and back plate through enlarged openings in said mounting plate for clamping said plates together, and compression spring means between said ring and mounting plate acting when said bolts are loosened to separate said ring and mounting plate and to hold said plates in frictional engagement.

THEO. O. STRAUSS.

REFERENCES CITED

The following references are of record in the file of this patent:

UNITED STATES PATENTS

| Number | Name | Date |
|---|---|---|
| 280,867 | Sawyer | July 10, 1883 |
| 981,062 | Casler | Jan. 10, 1911 |
| 1,051,531 | Whipple | Jan. 28, 1913 |
| 1,264,892 | Campbell | May 7, 1918 |
| 1,483,190 | Kaegil | Feb. 12, 1924 |
| 1,819,837 | DeGraff | Aug. 18, 1931 |
| 2,162,246 | Cote | June 13, 1939 |

FOREIGN PATENTS

| Number | Country | Date |
|---|---|---|
| 549,225 | Germany | of 1932 |